(12) United States Patent
Schuchardt

(10) Patent No.: US 7,594,284 B2
(45) Date of Patent: Sep. 29, 2009

(54) TRANSPORT AID FOR WHEELED SUPPORT APPARATUS

(75) Inventor: Peter W. Schuchardt, Stillwater, MN (US)

(73) Assignee: Nu Star Inc., Shakopee, MN (US)

( * ) Notice: Subject to any disclaimer, the term of this patent is extended or adjusted under 35 U.S.C. 154(b) by 420 days.

(21) Appl. No.: 11/135,984

(22) Filed: May 24, 2005

(65) Prior Publication Data

US 2006/0045711 A1 Mar. 2, 2006

Related U.S. Application Data

(60) Provisional application No. 60/574,338, filed on May 25, 2004.

(51) Int. Cl.
*B60P 3/06* (2006.01)
(52) U.S. Cl. .................... 5/86.1; 254/10 R; 414/427
(58) Field of Classification Search ............ 5/510–511, 5/86.1; 414/483–485, 427–428; 280/402; 180/11, 199, 200, 202; 211/23–24; 410/9, 410/66; 254/10 R–10 B
See application file for complete search history.

(56) References Cited

U.S. PATENT DOCUMENTS

| | | | | | |
|---|---|---|---|---|---|
| 3,049,253 | A | * | 8/1962 | Cabral | 414/428 |
| 3,876,024 | A | * | 4/1975 | Shieman et al. | 180/19.1 |
| 4,210,341 | A | | 7/1980 | Minkoff | 280/79.1 |
| 5,352,083 | A | * | 10/1994 | Roberts et al. | 414/477 |
| 5,580,207 | A | * | 12/1996 | Kiebooms et al. | 414/495 |
| 5,662,131 | A | * | 9/1997 | Scarborough et al. | 135/65 |
| 5,819,338 | A | * | 10/1998 | Hession | 5/86.1 |
| 5,934,694 | A | | 8/1999 | Schugt et al. | 280/33.991 |
| 6,220,379 | B1 | | 4/2001 | Schugt et al. | 180/65.1 |
| 6,648,300 | B2 | * | 11/2003 | Chamoun | 254/10 B |
| 6,729,421 | B1 | * | 5/2004 | Gluck et al. | 180/11 |
| 6,834,402 | B2 | * | 12/2004 | Hanson et al. | 5/81.1 R |
| 6,871,714 | B2 | * | 3/2005 | Johnson | 180/19.2 |
| 7,021,407 | B2 | * | 4/2006 | Ruschke et al. | 180/11 |
| 7,090,041 | B2 | * | 8/2006 | Vogel et al. | 180/19.3 |
| 7,195,253 | B2 | * | 3/2007 | Vogel et al. | 280/19.1 |
| 7,219,754 | B2 | * | 5/2007 | Johnson | 180/19.2 |
| 2002/0084116 | A1 | * | 7/2002 | Ruschke et al. | 180/11 |
| 2005/0098362 | A1 | * | 5/2005 | Johnson | 180/11 |
| 2006/0102392 | A1 | * | 5/2006 | Johnson et al. | 180/19.1 |
| 2006/0175100 | A1 | * | 8/2006 | Ruschke et al. | 180/11 |

* cited by examiner

*Primary Examiner*—James Keenan
(74) *Attorney, Agent, or Firm*—Gary L. Huusko

(57) ABSTRACT

A self-propelled transport aid for wheeled structures is advantageously provided. The transport aid generally includes a chassis, a lift assembly operatively supported thereby, and preferably a wheel capturing apparatus operatively united with the lift assembly. The wheel capturing apparatus has a first configuration for receipt of a wheel upon a wheel landing of the apparatus, and a second configuration for retention of the wheel received upon the wheel landing in the first configuration, wherein the first configuration of the wheel capturing apparatus is associated with a down position thereof. Alternate means for receiving and retaining a portion of a wheeled structure are further disclosed.

2 Claims, 9 Drawing Sheets

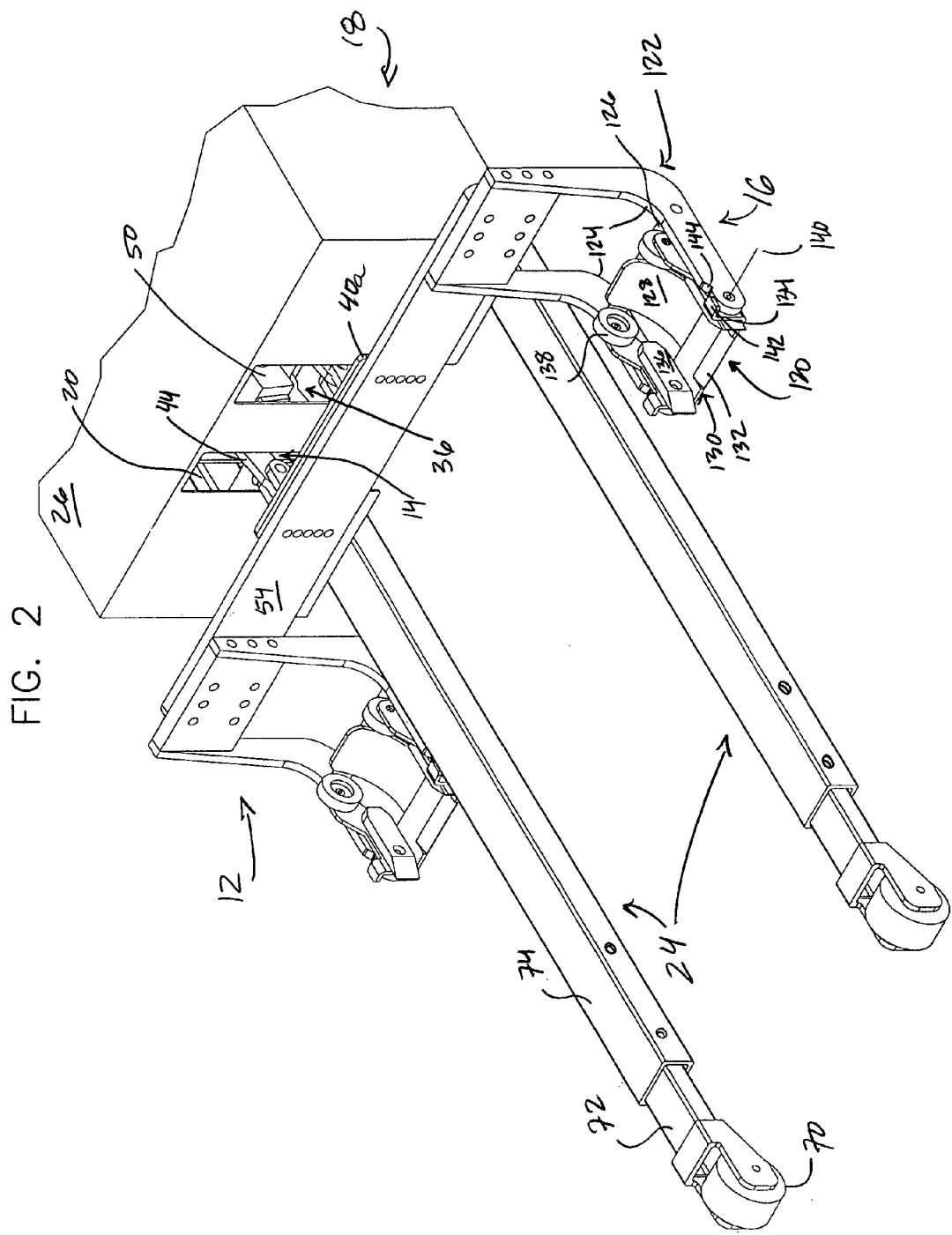

TRANSPORT AID FOR WHEELED SUPPORT APPARATUS

This is a regular utility application filed under 35 U.S.C. §111(a) claiming priority under 35 U.S.C. §119(e)(1), of provisional application Ser. No. 60/574,338 having a filing date of May 25, 2004.

TECHNICAL FIELD

The present invention generally relates to transport and/or lifting devices or aids, more particularly, to a transport device for receipt of a portion of a wheeled support platform, for instance, hospital beds, stretchers, gurney, etc., more particularly, a frame member or ground engaging wheel thereof.

BACKGROUND OF THE INVENTION

Wheeled support apparatuses or platforms of a variety of sizes and shapes are known to be available for the transport of persons, equipment, goods, etc., from one location to another. In furtherance of eliminating, at least minimizing, the strain and pain of manually pushing or pulling such wheeled support platforms, a variety of lifting, moving and/or transport devices are known to be available. Especially challenging for moving about are wheeled support platforms characterized by at least one pair or set of casters, for example, hospital beds which are particularly cumbersome and difficult to move or generally transport within a healthcare facility or the like. As is well documented, work related musculoskeletal disorders, such tendinitis and low back pain, account for $20 billion in worker's compensation costs each year, and approximately one third of all workday injuries.

Heretofore known devices or apparatus for moving wheeled support platforms generally, and hospital beds more particularly, generally suffer from a variety of shortcomings. For example, the StatMover (www.statmover.com) utilizes two clamps to mimic a hand grasping technique in furtherance of manual bed moving and transport. In addition to a generally weak interface between the device and the bed (i.e., the bed is easily detachable from the clamps), bed maneuvering via the device is difficult due in part to minimal power and/or traction, and a general device configuration which results in a functionally restraining or limiting "length" for the device. Such device shortcomings, if not prohibitive, make bed transport up/down ramps commonly found in health care facilities difficult, and elevator loading and unloading burdensome.

In addition to a grasping or clamped engagement for known moving and transport devices, a variety of hitch mechanisms are also available, as for instance via those from Dane Industries, Inc., or Stamina Lifters Pty Ltd. Generally, such devices have ample power, however, the device, with bed in tow, drives like a car pulling a trailer, making it difficult to generally maneuver the combination, and more particularly, making it nearly impossible to back the unit up as is frequently required in the course of a transport operation. Furthermore, the bed and the device together are far too long in length to fit into elevators, as well as to maneuver some of the commonly encountered ramps which are configured in a switch-back arrangement.

In light of the shortcomings of heretofore known bed moving and transport apparatuses, it is desirable and advantageous to provide: a transport aid or device which substantially fits below or within the foot print of the item requiring transport, more particularly, a transporter which substantially underlays a wheeled support platform; a lifting mechanism in such device which removes at least one set of wheels from ground engagement so as to facilitate transport of a support platform equipped with same; a guide structure in such transporter for the unsupported portion of the wheeled support platform to improve maneuverability; a mechanism for such transporter which easily, repeatedly, and reliably secures the wheeled support platform to the device, i.e., receives and retains a portion of the wheeled support platform, e.g., by a frame element or wheel thereof; a transporter that is readily adapted or inherently adaptable to selectively alter components thereof to effectively create a minimal foot print to facilitate transport operations and/or device storage; and, a transporter which is characterized by a lifting modularity, that is to say, is adapted to interface with transport specific lifting tools.

SUMMARY OF THE INVENTION

A self-propelled transport aid for wheeled structures is advantageously provided. The transport aid includes a chassis, a lift assembly operatively supported thereby, and a wheel capturing apparatus operatively united with the lift assembly. The wheel capturing apparatus has a first configuration for receipt of a wheel upon a wheel landing of the apparatus, and a second configuration for retention of the wheel received upon the wheel landing in the first configuration, wherein the first configuration of the wheel capturing apparatus is associated with a down position thereof. Alternate means for receiving and retaining a portion of a wheeled structure are further disclosed.

The subject transport, lifting or moving apparatus is an electrically powered motive device that is used to move wheeled support platforms, more particularly, hospital beds, stretchers, gurney, etc. The purpose of using a motorized moving device to move such items is to: (1) prevent the operator from injuring him/herself by over exerting their body; (2) prevent him/her from injuring others; and, (3) reduce the number of people required to move the transportable item for which moving or transport is sought.

An intuitive control is provided as part of a handle assembly of the device for user manipulation in furtherance of moving or transporting the bed, or bed and patient, throughout the health care facility. The further the lever is depressed, the faster the device will travel. To go in reverse, an operator reverses the lever direction, again, the further the lever is depressed, the faster the device/combination will travel.

The subject device further includes guide arms, more particularly, a pair of telescoping steering rails which, first provide stability for the device when there is no bed engaged, and, second, provide wheeled support at the far end of the bed (i.e., opposite the lifting mechanism) to facilitate steering of the unit. Having wheeled support at the far end of the bed prevents the bed from wanting to swing outward when it is being turned around corners, thus increasing the easy maneuverability of the device in combination with the bed for transport.

The subject device is especially advantageous in that it substantially fits below or under the bed for which transport is sought. Generally, the overall length of the device in combination with the bed is only a few inches greater than the length of the bed itself. This is particularly critical for a bed transported using the subject device to fit most elevators, and to permit 360 degree rotation and general maneuverability in tight areas often encountered in health care/hospital environments or settings.

Bed support structure or structures, i.e., towing interfaces, may advantageously be received or other wise integrated at/with a lifting plate of the lift assembly, as by a yoke or arms. In one embodiment, a hook for receiving and retaining a portion of a frame is provided, and in another embodiment, a wheel trap assembly is contemplated for receiving and retaining a wheel of a wheeled support apparatus.

As will be more fulled developed and described, to move a support structure equipped with wheels, one of two pairs thereof are positioned for receipt on/in on the wheel trap assemblies of the transporter. User actuation of a lifting mechanism raises the trap assemblies, thereby capturing the wheels therein, and thereafter lifts an end of the wheeled support apparatus. By lifting a pair of the bed's wheels slightly off the ground, the wheels of the pair are effectively removed (i.e., operably or functionally removed), and are replaced or substituted with a motorized drive wheel, or drive wheel assembly, of the subject device. By this arrangement, the bed and the subject device achieve a very secure weight bearing interface, each essentially integrated or united into a single driven assembly which provides for supreme maneuverability.

Upon arrival of the bed at the desired location or destination, the lifting mechanism is deactivated in furtherance of lowering the previously elevated portion of the bed, more particularly, the set of wheels received and retained within the trap assemblies. Once the previously trapped wheels have been lowered to the ground, disengagement of the device from the bed is possible.

Lifting up two of the wheels of the bed causes half of the weight of the bed to be redistributed onto and through the subject device. Having half the bed's weight on the drive assembly provides a great deal of traction for the device in transport, which, combined with the device's powerful electric motor, makes moving beds up to 1,800 pounds very easy, even up carpeted ramps. More specific features and advantages obtained in view of those features will become apparent with reference to the drawing figures and DETAILED DESCRIPTION OF THE INVENTION.

BRIEF DESCRIPTION OF THE DRAWINGS

Referring now to the drawings wherein like numerals are used to designate like parts of the invention throughout the figures:

FIG. 2 illustrates a fragmentary view of the transport apparatus of FIG. 1 equipped with bed supporting structures, more particularly, wheel trap assemblies in combination with a yoke, the assemblies positioned for receipt of wheels of a wheeled bed;

DETAILED DESCRIPTION OF THE INVENTION

Figure 1:
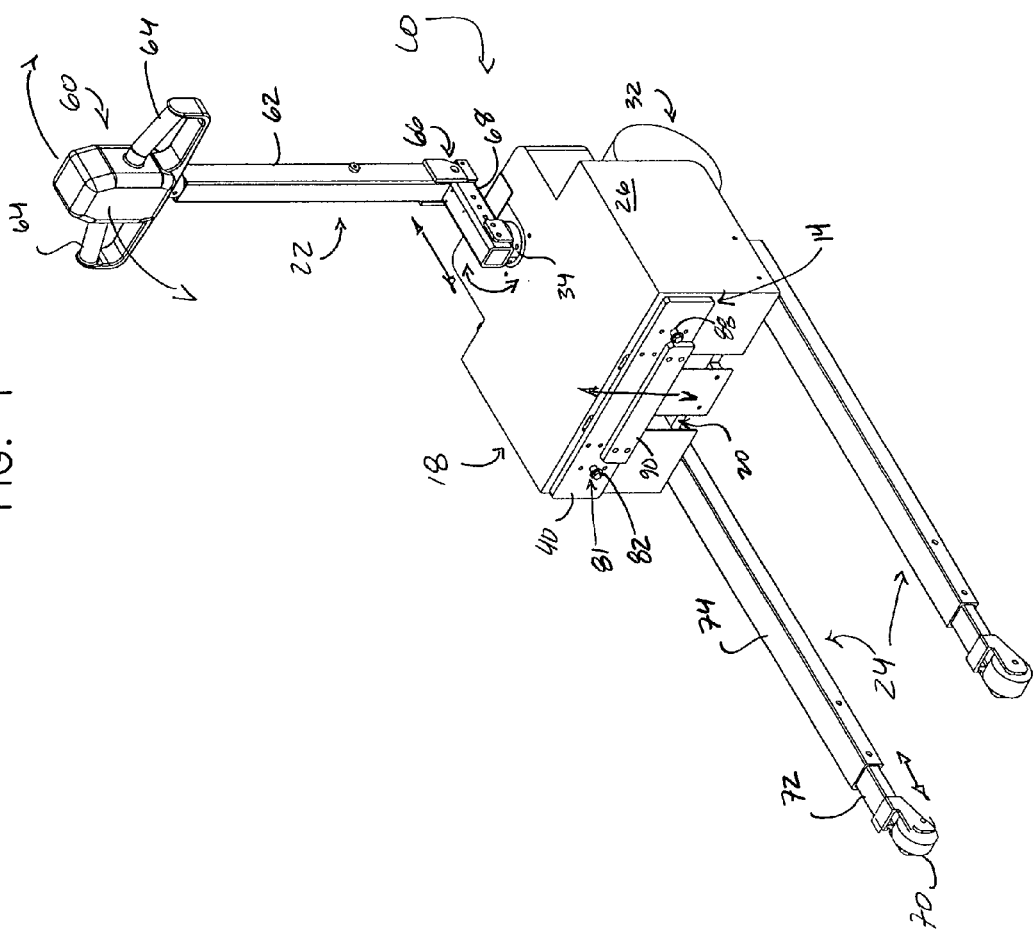
FIG. 1 is a perspective view, from slightly above and behind, of the transport aid or apparatus of the subject invention.
Figure 1A:
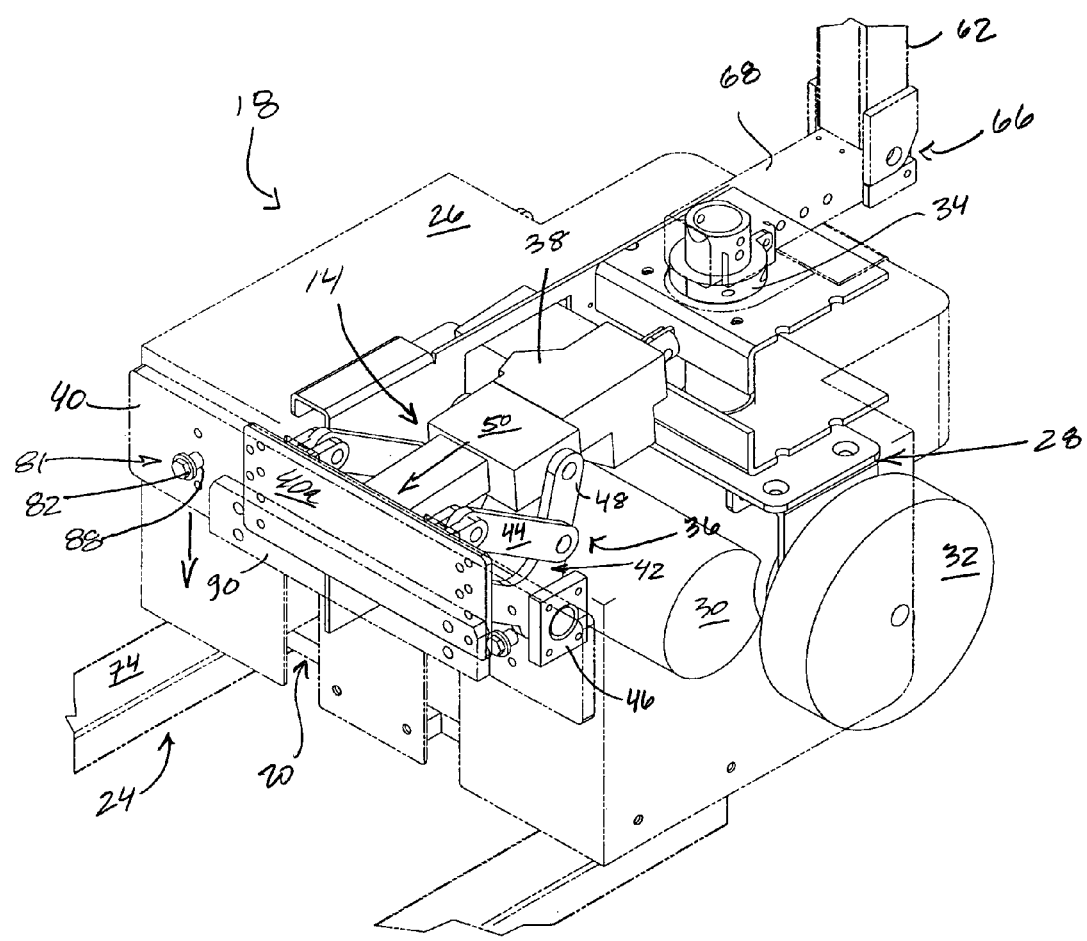
FIG. 1A is an enlarged view of the base of the apparatus of FIG. 1, a portion of a housing thereof broken away to show underlying detail.
Figure 7:
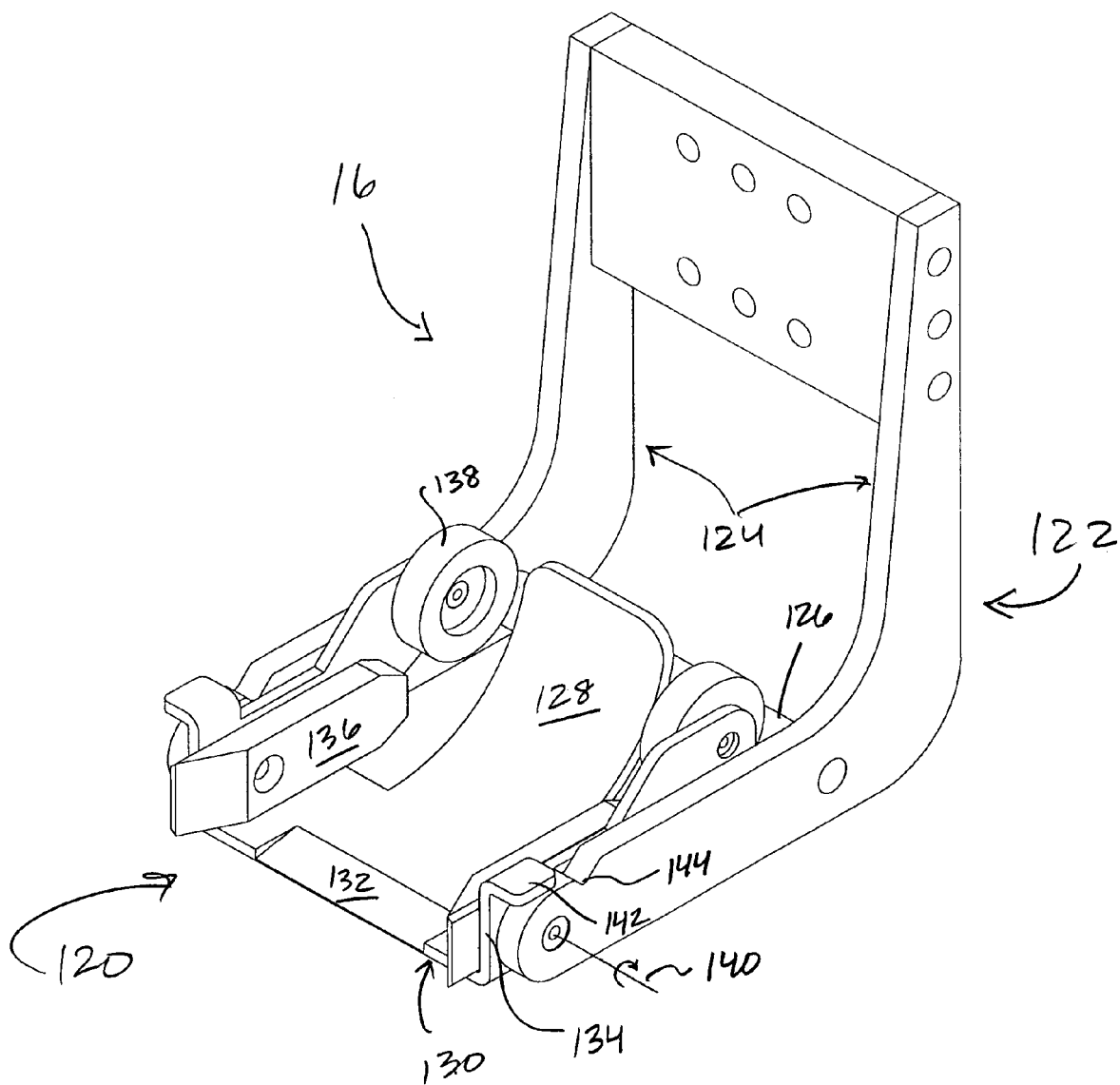
FIG. 7 illustrates the wheel trap assembly of FIG. 2 in a readied condition for receipt of a bed wheel therein; and, FIG. 8 shows the wheel trap assembly of FIG. 7 in a wheel retaining configuration.
Figure 8:
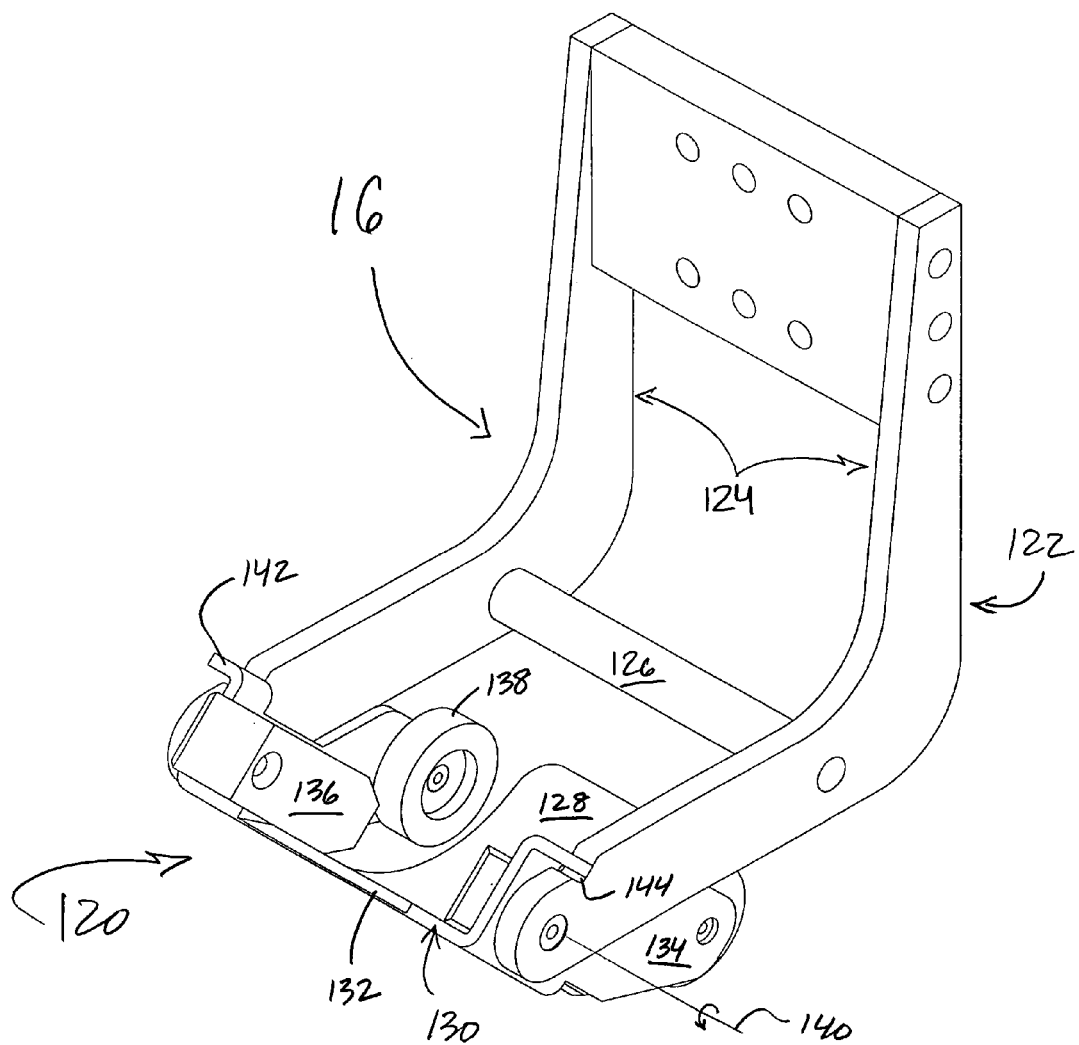

As a preliminary matter, the transport apparatus 10 of the subject invention is generally shown in FIG. 1, and more particularly shown in FIGS. 2, 3, 5 & 6 equipped with bed support structures 12, each of which is adapted, or readily adaptable for receipt and retention of a portion of a bed or other such structure for which transport is sought. Among other things, a lifting assembly 14 of the apparatus of the subject invention is generally shown in FIG. 1A, with FIGS. 7 & 8 illustrating features and elemental interrelationships of a wheel trap assembly 16 of the subject invention, more particularly, the trap assembly of the bed support structure of FIG. 2. As should be readily appreciated with reference to the figures, and as will be further developed, the subject transport apparatus advantageously, but not necessarily, has associated with it a modularity, that is to say, the apparatus of FIG. 1 may be selectively equipped, by various means illustrated and otherwise generally known, with the illustrated bed support structures, or variants thereof, as the transport circumstances warrant, and/or the bed support structure, or structures, may be readily adapted to facilitate a specific transport job.

Referring now to FIGS. 1, 1A, and 2, the transport and/or moving apparatus 10 of the subject invention generally includes a base 18, which comprises a chassis 20 (see especially FIG. 1A), a handle assembly 22, and spaced apart guide or guiding arms 24. The handle assembly 22 and guide arms 24 generally extend from the base 18, preferably, but not necessarily as depicted in FIG. 1A, and may be directly or indirectly supported thereby, e.g., in the case of the guide arms, supported by a base or body housing 26.

The transporter 10 further generally includes drive 28 and lift assemblies 14, each of which are advantageously operatively supported by the chassis 20 (FIG. 1A). As shown, and is well know in the art, the drive assembly 28 generally includes a power source 30, more particularly a rechargeable power source, driven wheels 32, and a steering knuckle 34 or the like. The lift assembly 14 generally includes an actuatable linkage 36 for raising/lowering an end of a transportable structure, e.g., a bed, via a towing structure, e.g., a bed support structure 12 as shown in FIG. 2, which is adapted to support a bed end in furtherance of disengaging a set of floor or ground engaging wheels thereof from the floor or ground.

With particular reference now to FIG. 1A, the linkage 36 of the lift assembly 14 of the transporter 10 is generally operatively interposed between a link actuator 38 and a lift bracket or plate 40, or 40a (contrast the lift assemblies of FIGS. 1, 3, 5, and 6, with that of FIG. 2). The link actuator or mechanism 38 is generally supported, at an end thereof as shown, to a portion of the body chassis 20, e.g., a frame member or element. The linkage advantageously, but not necessarily, includes united link arms 42, e.g., bell cranks, from which extend link bars 44, the free ends of the bars being joined to/with the lift plate 40/40a, as shown, e.g., via a knuckle joint arrangement or the like. Intermediate each of their opposing ends, the united link arms 42 are pivotally supported by opposingly paired link blocks 46. First arm ends 48 of the united link arms 42 are advantageously supported by a slider 50 of the link actuator 38 while second arm ends thereof (not visible) are joined to/with the lift plate 40/40a (not shown) as the link bars. As should be readily appreciated with respect to FIG. 1A, lift plate "up," and FIG. 2, lift plate "down," with actuation of the lift mechanism 38, the slider 50 translates towards the lift plate 40/40a, as indicated, causing counter clock-wise rotation/pivoting of the visible link arm 42 of FIG. 1A, resulting in lift plate travel from the up (FIG. 1/1A) to the down (FIG. 2) positions illustrated.

As will be further and subsequently developed with discussion of the illustrated bed support structures, the lift plate 40/40a of the lift assembly 14 functions to essentially interface with, i.e., receive, the bed support structures 12, either collectively (e.g., see FIGS. 2 & 6) or separately (e.g., see FIGS. 3 & 5). Consistent with the prior discussion of lift mechanism operation, the lift plate 40/40a is adapted to receive ends of the bell cranks 42 and link bars 44, and is intended to be readily adapted to support or carry a variety of bed support or engaging structures, more particularly, to mechanically interface with a portion thereof or linkage therefore, for example a single beam or yoke 54, e.g., FIGS. 2 & 6, or paired arms 56, e.g., FIGS. 3 & 5.

Referring now specifically to FIGS. 1/1A, the handle assembly 22 of the subject invention generally includes an operator interface 60, more particularly a controller, supported at an end of an arm 62 of the handle assembly 22. The operator interface includes paired hand holds 64, as shown, and further advantageously, but not necessarily, includes a variety of controllers for actuating, among other things, the lift assembly 14 as well as the drive assembly 28 for the transporter 10.

The arm 62 of the handle assembly 22 preferably includes a pivot linkage 66, or is otherwise capable of articulation as indicated (FIG. 1), so as to permit the operator interface 60 to be positioned at a select operative angle relative to the horizon to facilitate transport operations, e.g., the operator interface 60 may swing through an angular range from at least vertical, i.e., 90° (FIG. 1) to at least horizontal, i.e., 0°. Furthermore, and advantageously, the handle assembly 22 is selectively received upon or integrated with a portion of the drive assembly 28, e.g, the steering knuckle 34 as illustrated (FIG. 1A), so as to, as the task warrants, alter the "forward" reach of the handle assembly 22, more particularly, the operator interface 60 thereof. Advantageously, a "loaded" length dimension for the apparatus 10, i.e., the distance between a trailing or free bed edge and the operator interface 60 of the handle assembly 22, is to be minimized, with "savings" of even an inch in length critical to loading into and onto an elevator, or maneuvering ramp switchbacks. Essentially, by means of a stem 68 adapted to be adjustably received the steering knuckle 34 of the drive assembly 28 (FIG. 1A), the proximity of the arm joint 66 laterally with respect to the base 18 can be manipulated or regulated.

With continued reference to FIGS. 1, 1A, and 2, and especially FIGS. 1 & 2, the guide or guiding arms 24 extend from the base 18 of the transporter, and each include a floor or ground engaging wheel 70 at a free end thereof. Preferably, but not necessarily, the guide arms 24 are telescopic in character, that is to say, a reversibly extendable arm segment 72 is selective received within, as shown, or over an arm segment or portion 74 which is fixed to the base 18. Detents or other known quick affixation means secure the arm segments or portions to each other in furtherance of advantageously positioning the guide arm wheels 70 proximal or adjacent wheels of a bed or the like. Notionally, the guide arm wheels are intended to supplant the rearward/rearward most set of wheels in a bed received for transport utilizing the subject transporter, especially where the rearward/rearward most wheel set includes casters. With such arrangement, greater stability of the bed is achieved in all aspects of the moving or transport operation.

Figure 3:
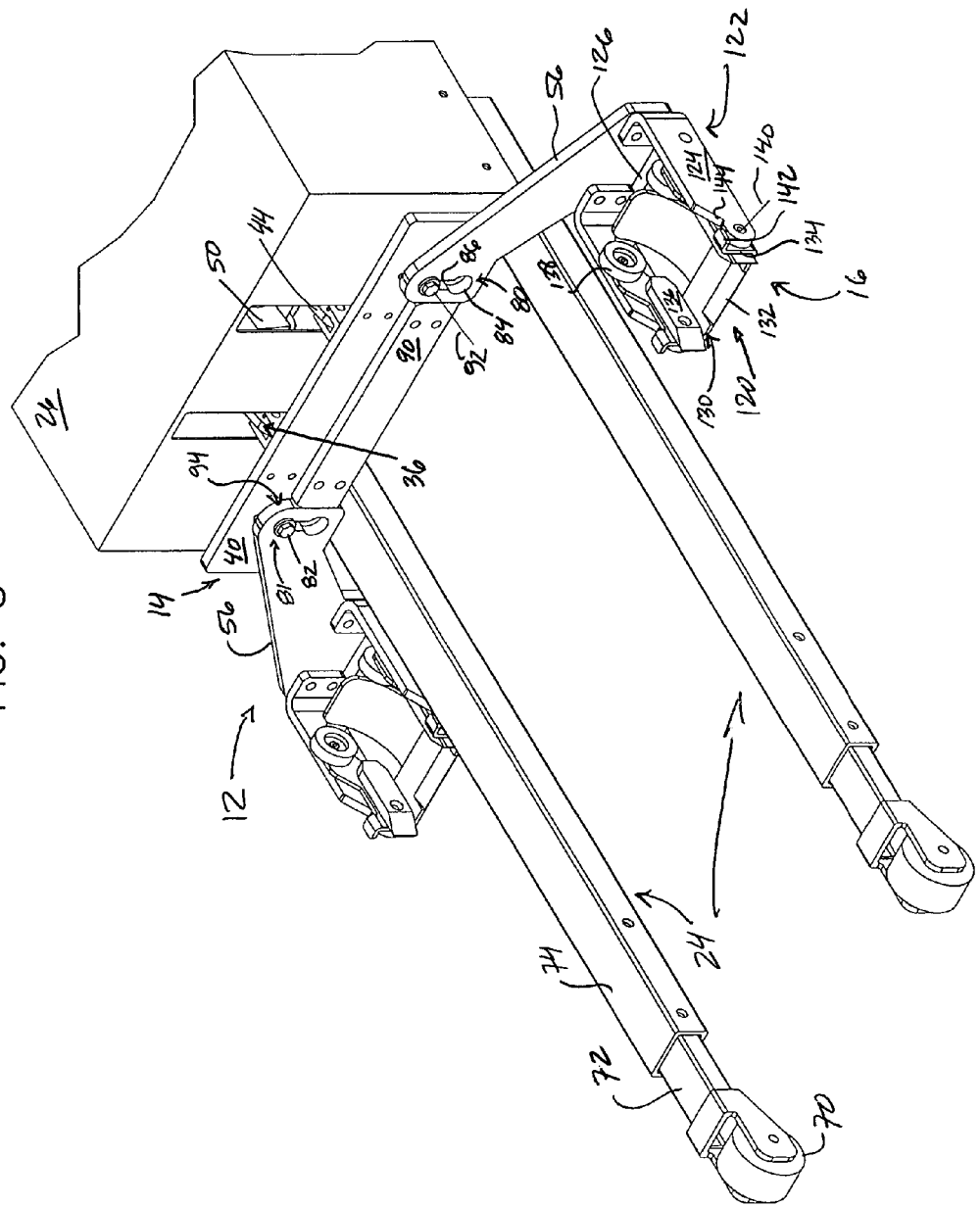
FIG. 3 is a view as FIG. 2, the apparatus equipped with bed supporting structures, more particularly, wheel trap assemblies in combination with pivot arms supporting each assembly, the assemblies positioned for receipt of wheels of a wheeled bed.
Figure 5:
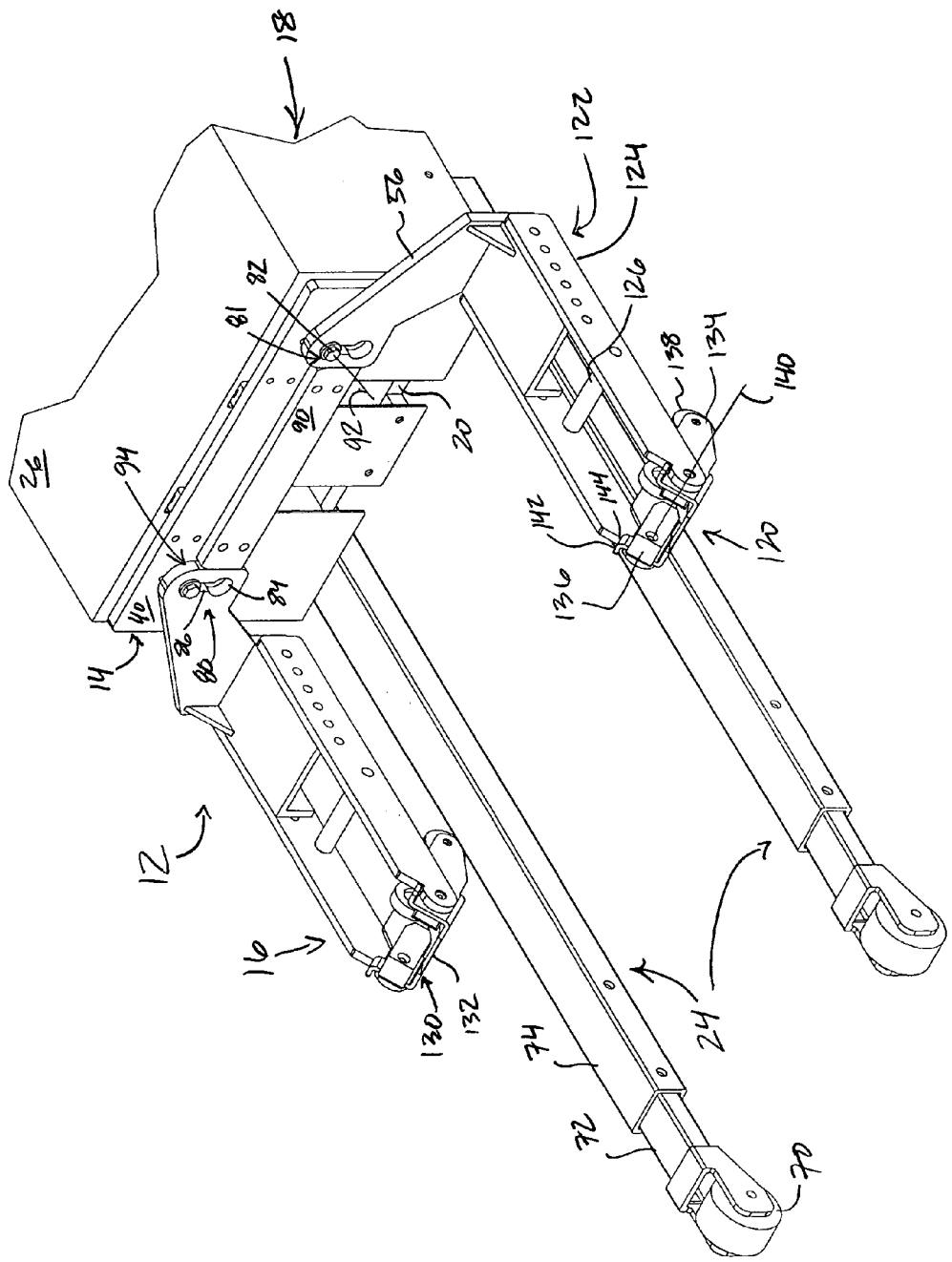
FIG. 5 is a view as FIG. 2, the apparatus equipped with a variant of the bed supporting structures of FIG. 3, the structures positioned in a wheel retaining condition, the arms in an elevated condition.
Figure 6:
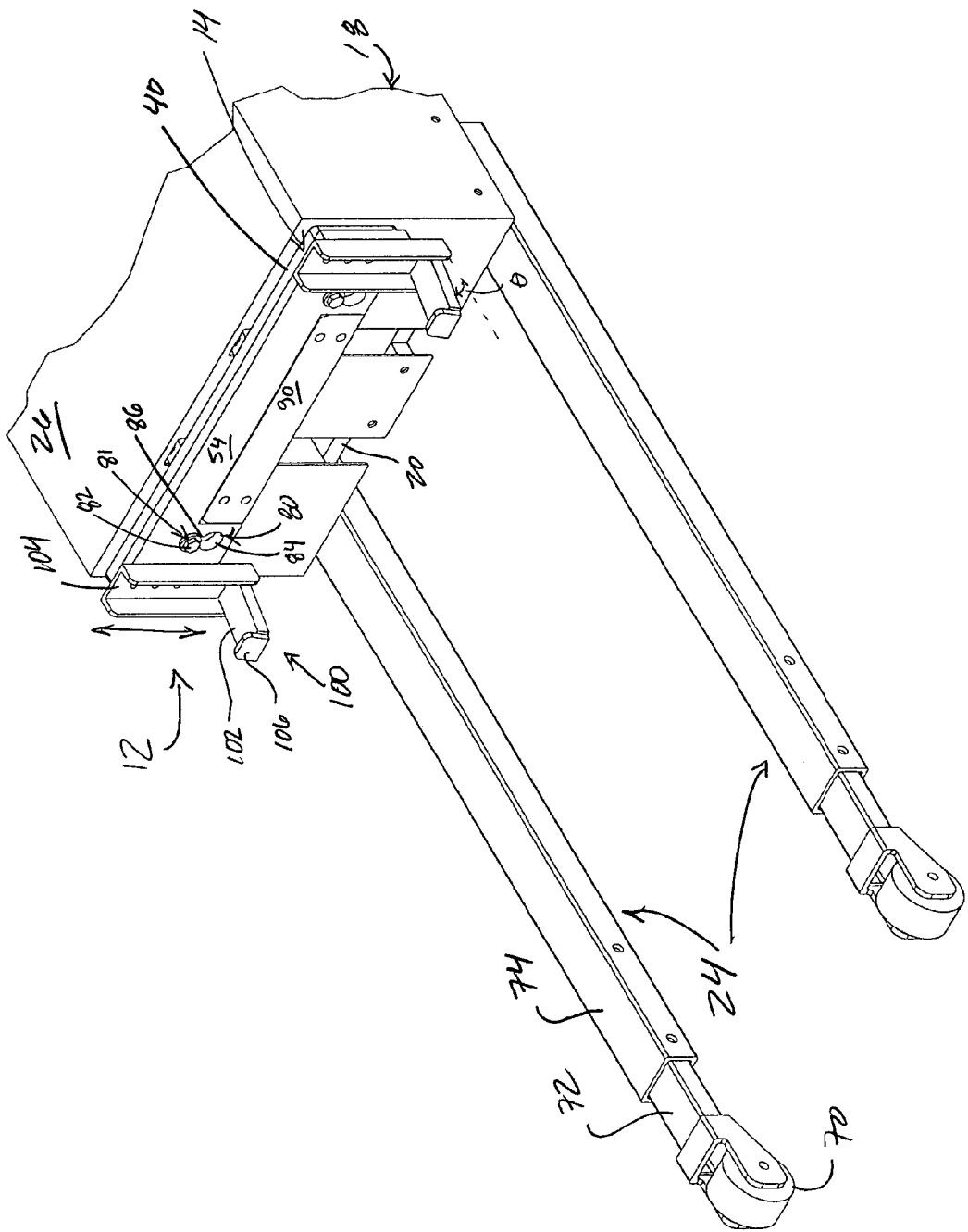
FIG. 6 is a view of as FIG. 2, the apparatus equipped with bed supporting structures, more particularly, frame hooks in combination with a yoke, the structures positioned for retention of a portion of a frame of a framed bed.

Preferred, alternate bed receiving/supporting structures are best seen with reference to FIGS. 2, 3 and 5 on the one hand, and FIG. 6 on the other hand. Prior to a description of each style of illustrated bed receiving/supporting structure, including variants thereof, a brief presentation of advantageous, no-limiting mechanisms by which such structures are supported, either directly or indirectly as the case may be, by the lift assembly, more particularly, the lifting plate or bracket thereof, is warranted.

With particular reference to FIGS. 2 & 6, a beam or yoke 54 is shown carrying bed supporting structures 12 at opposing ends thereof, with the yoke 54 in turn operatively linked, i.e., attached, to the lifting plate or bracket 40/40a. The yoke 54 may be integrated with the lifting plate 40/40a using well known and traditional fastening means, e.g., nuts and bolts as contemplated in FIG. 2 with respect to plate 40a, or the yoke 54 may be adapted for easy on/off positioning with respect to plate 40, for instance to facilitate bed support structure change-outs, apparatus storage, and/or apparatus maneuvering when "empty."

For instance, as shown in FIG. 6, keyways 80 are provided in the yoke 54 for reversible receipt of a head 82 of a bolt 81 or the like, more generally a fastener head. The keyway 80 includes a first portion 84 dimensioned to receive the head 82 therethrough, and a second portion 86 extending therefrom dimensioned so as to permit sliding receipt of a shank 88 of the bolt or fastener 81, and thereby define a "home" position therefore. As illustrated, the yoke 54 is self-locking with respect to the lifting plate 40, the yoke 54 downwardly sliding upon the fastener shanks 88, via the keyways 80, such that the shank 88 transitions from a position within the first portion 84 of the keyway 80 to a position within the second portion 86 thereof. A further supplemental support plate 90 may be provided for selective or reversible integration with the lift plate 40 as shown, or such structure may be inherently provided in a lifting plate/bracket per se, the idea being to reduce loading upon the keyway receiving elements, i.e., more efficiently distribute the load of the lifting mechanism at the lifting plate. It is to be understood that alternate functional equivalents of lift assembly/support structure interface are likewise contemplated and considered to be within the scope of the subject disclosure.

Referring now to FIGS. 3 & 5, each bed support structure 12 is shown depending from an arm 56 or the like. It should be appreciated that the lift plate 40 of the lift assembly 14 illustrated is preferably, but not necessarily, configured so as to include further support plate 90, and that each arm 56, in or at a free end portion thereof, advantageously includes a keyway 80, each of said features as previously described in relation to FIG. 6. The arms 56 of the bed support structures 12, in addition to having the on/off functionality of yoke 54 of the structure of FIG. 6, and attendant advantages thereof, further preferably include a pivot functionality in furtherance of, among other things, bed support structure stowage.

Figure 4:
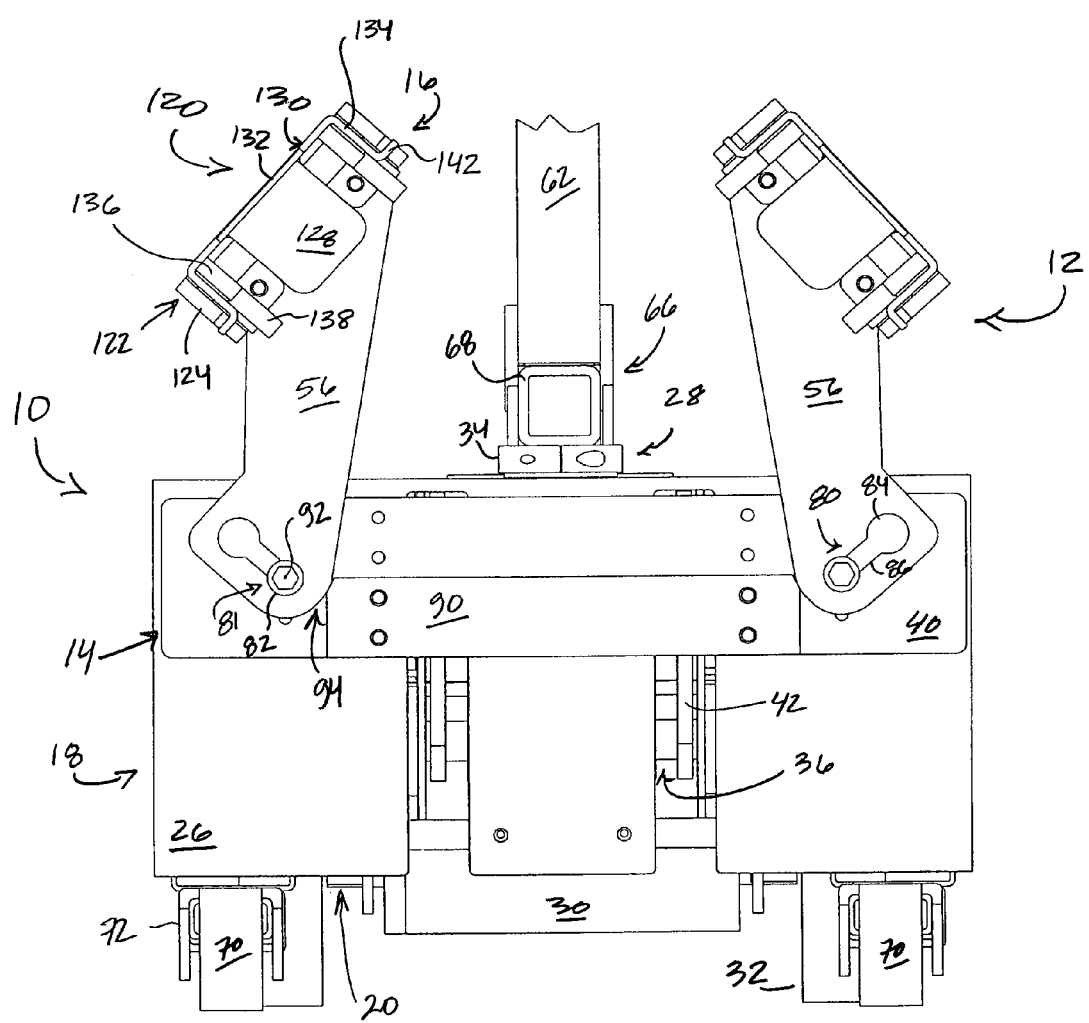
FIG. 4 is an elevation end view of the apparatus of FIG. 3, the bed supporting structures shown in a stowed condition to facilitate, among other things, apparatus storage.

With continued reference to FIGS. 3 & 5, and specific reference to FIG. 4, it should be readily appreciated that each of the support structure arms 56 may be selectively, and readily manipulated with respect to each of the fasteners or hangars 81 of the lift plate 40, more particularly, freely pivoted about a pivot axis 92, delimited by the fastener 81, from the arrangement of FIG. 3 or 5, with an arm alignment such that the fastener shank 88 is received in the second keyway portion 86 from the first keyway portion 84. In furtherance of "locking" the support structure arms 56 in the illustrated configuration of FIG. 4, the arm 56 is provided with a camming surface 94 adjacent the keyway 80, more particularly, adjacent the home portion 86 thereof. The camming surface or portion 94 of the arm 56 is free/clear of the secondary support plate 90 during a swing of the arm 56 through the pivot motion, however, upon subsequent return receipt of the fastener shank 88 to the first keyway portion 84 from the second keyway portion 86, the arm 56 is positioned such that the camming arm portion 94 catches a portion of the supplemental or secondary support plate 90, i.e., an interference fit is established between the arm 56 and the secondary support plate 90 so as to prohibit unintended arm rotation.

With reference now to FIGS. 6-8, specific bed engaging structures of the subject invention are illustrated, more particularly, a hook 100 (FIG. 6) for receiving and retaining a portion of a bed frame, e.g., a bariatric bed frame, and a wheel trap assembly 16, namely that of FIG. 2, for receiving (FIG. 7) and retaining (FIG. 8) a wheel of a wheeled bed or the like. A brief description of the frame engaging structure of FIG. 6 will preface a detailed discussion of the elements and interrelationships of the wheel trap assembly of FIG. 2/7, as well as the points of distinction for the assemblies of FIGS. 3 & 5.

The hook style bed support structure of FIG. 6 generally includes hook 100, more particularly, a frame platform 102, i.e., a landing, extending from an end of a shank 104. The shank 104, e.g., a segment of angle iron or the like as illustrated, is adapted so as to be variably positionable upon the yoke 54, more particularly, the frame platform 102 "height," relative to the yoke 54, may be operator selected commensurate with the nature of the frame or frame portion to be received thereupon. Although the frame platform 102 may extend from the shank 104 so as to be perpendicular thereto, it is advantageous that the platform 102 be at an angle θ of about 10° from the horizon, or more generally within the range of about 5-20°. Furthermore, as shown, the frame platform 102 of the hook 100 advantageously includes a stop or catch 106, e.g., a rim, lip, etc. at a free end thereof so as to facilitate retention of a frame received thereupon.

Referring now generally to FIGS. 7 & 8, and specifically FIG. 7, the wheel trap assembly 16 of the subject invention generally includes a wheel plate or platform 120, for receiving a wheel of a bed or the like, hingedly or pivotingly supported within portions of a plate frame 122, e.g., at free ends of opposingly paired arms 124 as shown, for pivoting with respect thereto when the wheel trap assembly 16 is raised from ground or floor engagement, more particularly, when the plate frame 122 is raised from the ground or floor (i.e., contrast FIG. 2 or 3 with FIG. 5). The assembly further preferably includes a wheel stop 126, e.g., a transverse frame element such as a bar, rod, etc., further details and the functionality thereof to be subsequently discussed in relation to FIG. 8.

The pivoting wheel platform 120 generally includes a curved or arcuate wheel landing surface 128, i.e., a wheel cup, adjacent a ramped edge portion 130 of the wheel platform 120 having a ramp 132. While the ramp 132 of the ramped edge portion 130 facilitates ingress/egress of a wheel into the trap 16, more particularly, the wheel landing surface 128, the wheel landing surface 128 is intended to cup or cradle a wheel received thereon during pivoting of the wheel plate 120 within the frame 122. As illustrated, the width dimension of the wheel landing surface is preferably, but not necessarily, less than the width dimension of the adjacent ramp portion of the platform.

Opposingly paired sidewalls 134 upwardly extend from opposing side edges of the ramp portion 130 of the platform 120, and "rearwardly," i.e., longitudinally, extend to about the depth of a terminal edge of the curved wheel landing surface 128. Each of the ramp portion sidewalls 134 is adapted to receive a wheel guide 136 at one end thereof, say a "front" end thereof (i.e., adjacent the ramp portion 130 of the platform 120), and a support wheel 138 at another end thereof (i.e., a "rear" end thereof, more particularly, adjacent the landing surface 128).

The wheel platform 120 is pivotally linked to free ends of the frame 122, i.e., arms 124, at the sidewalls 134 thereof, more particularly, proximal the front ends thereof so as to define a pivot axis 140 for the platform 120. Each of the ramp portion sidewalls 134 further include an outwardly extending tab 142 at the front or forward end thereof, in the vicinity the free end of the frame 122, i.e., proximal to the pivot axis 140 of the platform 120. With pivoting of the platform 120, the tab 142 of the platform sidewall 134 forms an interference fit with a portion of its adjacent frame member or element 124, namely, a notch 144 thereof, and thus prevents further pivoting of the platform (FIG. 8).

It should be readily appreciated that the subject wheel trap description, although laid out with respect to FIG. 7, i.e., the wheel trap assembly of FIG. 2, substantially applies to the trap assemblies illustrated in FIGS. 3 & 5. With reference thereto, common elements, either individually or in the context of a subassembly, e.g., the wheel plate or platform, should be readily identifiable. Structural departures for the illustrated assemblies are primarily related to the frame configuration for the assembly, more particularly, its adaptation for receipt upon an arm, yoke etc. (e.g., contrast FIGS. 2 & 3), or, its adaptation for a select spatial arrangement/configuration for the trap assembly in relation to the base of the apparatus (e.g., contrast FIGS. 3 & 5). In light of the foregoing, it is to be understood that a variety of permutations and/or equivalents of the described and/or illustrated trap assembly are possible without departing from the advantageous functionality to be next described.

With continued reference to FIGS. 7 & 8, the trap assembly 16 of the subject invention, more particularly the wheel plate or platform 120, is shown in FIG. 7 in a readied condition for receipt of a wheel, and in FIG. 8 in a wheel captured or wheel retaining position. With the trap 16 substantially engaged with the ground or floor, as FIG. 2, a bed wheel is easily rolled for receipt upon the wheel landing surface 128 of the wheel platform 120, facilitated by the inclusion of the ramp 132 and wheel guides 136. Once the bed is received within the frame 122 of the trap assembly 16, or more generally, received by the bed support structure (see also FIG. 6), the lift mechanism 38 of the lift assembly 14 is actuated in furtherance of raising the lift plate 40 thereof, and thusly, the bed support structures.

Upon disengagement of the frame 122 of trap assembly 16 from the ground, the wheel platform 120 progressively pivots (FIG. 7), the pivot angle being directly related to the height of the frame 122 from the floor. With such action, a cradled wheel within the assembly 16 is essentially "lowered," all be it minimally, within the frame 122 of the assembly 16 until the bed wheel contacts the wheel stop 126. As the distance between the pivot axis 140 and the wheel stop 126 is advantageously less than the diameter of the wheel, the wheel being thereby trapped in the frame 122, more particularly, between the wheel platform 120, more particularly the ramped edges portion 130 thereof, and the wheel stop 126.

At attainment of a select platform angle, which may be less than a maximum platform pivot angle delimited by the interference fit of the platform 120 relative to the frame 122, i.e., as by receipt of the tab 142 in the notch 144, during the raising of the lifting plate 40 of the lift assembly 14, the support wheels 138 of the trap assembly 16 contact the floor or ground surface, having previously moved into position for operative ground engagement while the bed wheels are effectively cradled by the wheel landing surface 128. With such arrangement, the supplemental wheels functionally supplant or replace the bed wheels 138. In such condition, the mass of the bed is maintained upon the ground or floor, with supreme guided bed transport enabled by a combination of the guide wheels 70 of the guide arms 24 and the supplemental wheels 138 of the trap assembly 16. Further raising of the bed support structure advantageously disengages the supplemental trap wheels 138 from the floor, the end of the bed adjacent the base 18 of the apparatus 10 being thereby fully supported by the bed support structure. With the shift in bed mass from the floor to the apparatus, more particularly, the base 18 thereof, enhanced traction and increased mobility is thereby gained.

In addition to those illustrated and/or discussed, there are other variations of the subject invention, including subassemblies thereof, some of which will become obvious to those skilled in the art. It will be understood that this disclosure, in many respects, is only illustrative. Changes may be made in details, particularly in matters of shape, size, material, and arrangement of parts, as the case may be, without exceeding the scope of the invention.

What is claimed is:

1. A bed transport apparatus comprising: a. a base comprising a chassis, a handle assembly and spaced apart bed guiding arms extending from said base, each of said spaced apart bed guiding arms including a floor engaging guide wheel for select positioning adjacent a floor engaging wheel of a bed; and, b. a lift assembly operatively supported by said chassis, said lift assembly comprising bed support structures adapted to receive and retain a portion of a bed in furtherance of disengaging a set of floor engaging wheels thereof from a floor, and an actuatable linkage for raising and lowering said bed support structures; wherein each support structure of said bed support structures is adapted to receive and retain a floor engaging wheel of the bed; wherein each support structure of said bed support structures comprises a bed wheel trap assembly for receiving and retaining the bed wheel; wherein said bed wheel trap assembly comprises a wheel receiving platform pivotally supported by a frame of said trap assembly; and wherein said wheel receiving platform pivots with respect to said frame upon raising said trap assembly from the floor.

2. A bed transport apparatus comprising: a. a base comprising a chassis, a handle assembly and spaced apart bed guiding arms extending from said base, each of said spaced apart bed guiding arms including a floor engaging guide wheel for select positioning adjacent a floor engaging wheel of a bed; and, b. a lift assembly operatively supported by said chassis, said lift assembly comprising bed support structures adapted to receive and retain a portion of a bed in furtherance of disengaging a set of floor engaging wheels thereof from a floor, and an actuatable linkage for raising and lowering said bed support structures; wherein each support structure of said bed support structures is adapted to receive and retain a floor engaging wheel of the bed; wherein each support structure of said bed support structures comprises a bed wheel trap assembly for receiving and retaining the bed wheel; wherein said bed wheel trap assembly comprises a wheel receiving platform pivotally supported by a frame of said trap assembly; wherein said wheel receiving platform pivots with respect to said frame upon raising said trap assembly from the floor; and wherein pivot travel of said wheel receiving platform is limited by cooperative engagement of a portion of said wheel receiving platform with a portion of said frame of said trap assembly.

* * * * *